US012681031B2

(12) United States Patent
Yokoyama et al.

(10) Patent No.: US 12,681,031 B2
(45) Date of Patent: Jul. 14, 2026

(54) AUTOMATIC ANALYZER

(71) Applicant: Hitachi High-Tech Corporation, Tokyo (JP)

(72) Inventors: Koki Yokoyama, Tokyo (JP); Takenori Okusa, Tokyo (JP); Shugo Okabe, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 608 days.

(21) Appl. No.: 18/026,865

(22) PCT Filed: Sep. 22, 2021

(86) PCT No.: PCT/JP2021/034719
§ 371 (c)(1),
(2) Date: Mar. 17, 2023

(87) PCT Pub. No.: WO2022/085353
PCT Pub. Date: Apr. 28, 2022

(65) Prior Publication Data
US 2024/0027484 A1      Jan. 25, 2024

(30) Foreign Application Priority Data
Oct. 20, 2020      (JP) ................................. 2020-175746

(51) Int. Cl.
*G01N 35/02* (2006.01)
*G01N 35/10* (2006.01)
*G01N 35/00* (2006.01)

(52) U.S. Cl.
CPC ......... *G01N 35/025* (2013.01); *G01N 35/026* (2013.01); *G01N 35/1002* (2013.01);
(Continued)

(58) Field of Classification Search
CPC ............... G01N 35/025; G01N 35/026; G01N 35/1002; G01N 35/0099; G01N 2035/00277; G01N 2035/0465
See application file for complete search history.

(56) References Cited

U.S. PATENT DOCUMENTS

2008/0019868 A1      1/2008  Okumoto et al.
2008/0311678 A1     12/2008  Ootani et al.
(Continued)

FOREIGN PATENT DOCUMENTS

JP          2008-26051 A       2/2008
JP          2008-309686 A     12/2008
(Continued)

OTHER PUBLICATIONS

International Search Report (PCT/ISA/210) issued in PCT Application No. PCT/JP2021/034719 dated Dec. 7, 2021 with English translation (four (4) pages).
(Continued)

*Primary Examiner* — Benjamin R Whatley
(74) *Attorney, Agent, or Firm* — Crowell & Moring LLP

(57) ABSTRACT

Provided is an automatic analyzer which smoothly discards a used reaction container while preventing space restrictions. The automatic analyzer in this invention includes a housing portion which houses a used container; a hollow discarding cylinder which guides the container to the housing portion in a vertical direction; a container gripping mechanism which grips the container by moving a plurality of gripping pieces close to each other in a horizontal direction and lets the container fall by separating the plural gripping pieces from each other in the horizontal direction; and a control section which controls the container gripping mechanism. A discarding hole in the upper end of the discarding cylinder is formed by a container guide portion for guiding the container and a gripping piece separating
(Continued)

portion forming a space for the plural gripping pieces to be separated from each other.

8 Claims, 11 Drawing Sheets

(52) U.S. Cl.
CPC ............. *G01N 2035/00277* (2013.01); *G01N 35/0099* (2013.01)

(56) References Cited

U.S. PATENT DOCUMENTS

| | | | | |
|---|---|---|---|---|
| 2014/0105719 A1* | 4/2014 | Mueller | ................. | G01G 19/52 |
| | | | | 414/800 |
| 2014/0107953 A1* | 4/2014 | Mueller | .............. | G01F 23/2962 |
| | | | | 702/54 |
| 2016/0154017 A1 | 6/2016 | Oguri et al. | | |
| 2021/0063422 A1 | 3/2021 | Yamashita et al. | | |

FOREIGN PATENT DOCUMENTS

| | | | | | |
|---|---|---|---|---|---|
| JP | 2014-233765 A | | 12/2014 | | |
| JP | 2016224048 A | * | 12/2016 | ............. | A61B 50/20 |
| JP | 2019-86418 A | | 6/2019 | | |

OTHER PUBLICATIONS

Japanese-language Written Opinion (PCT/ISA/237) issued in PCT Application No. PCT/JP2021/034719 dated Dec. 7, 2021 (three (3) pages).

* cited by examiner

DIRECTION A ➞

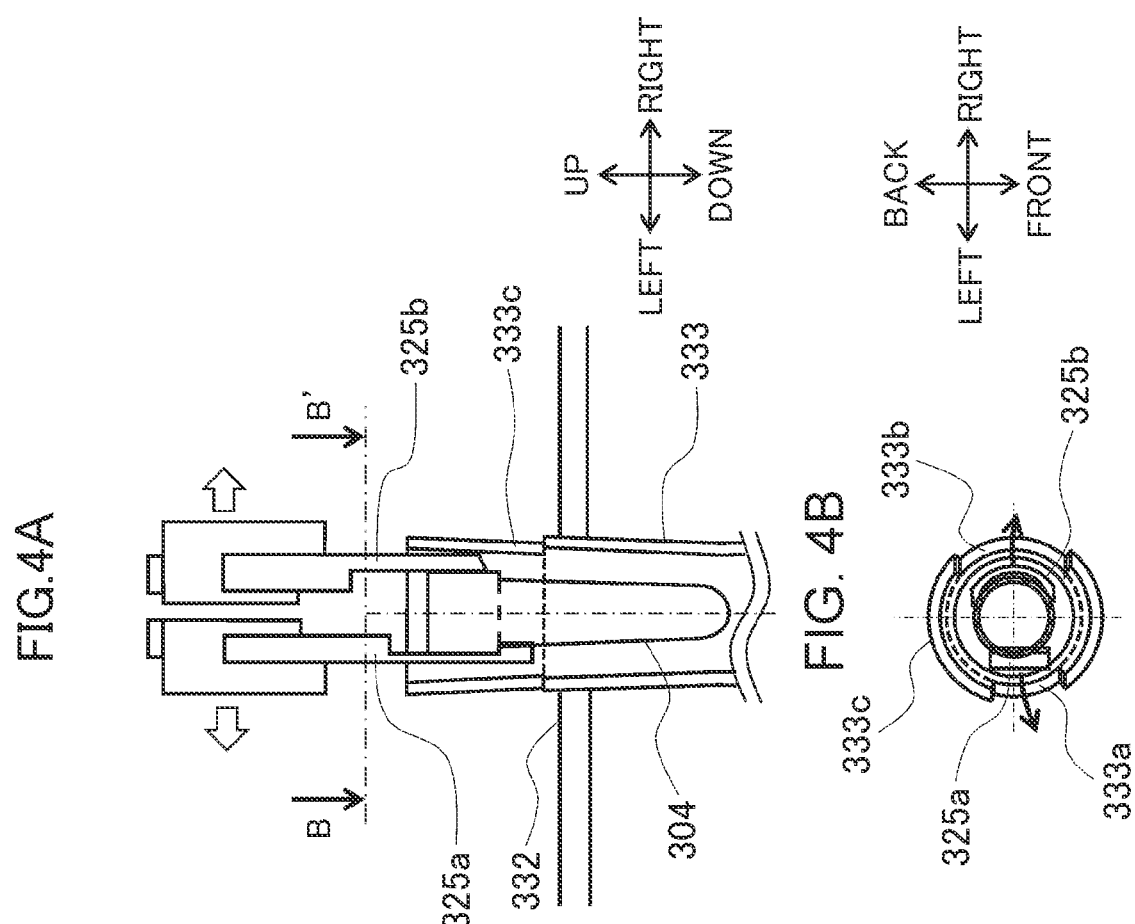

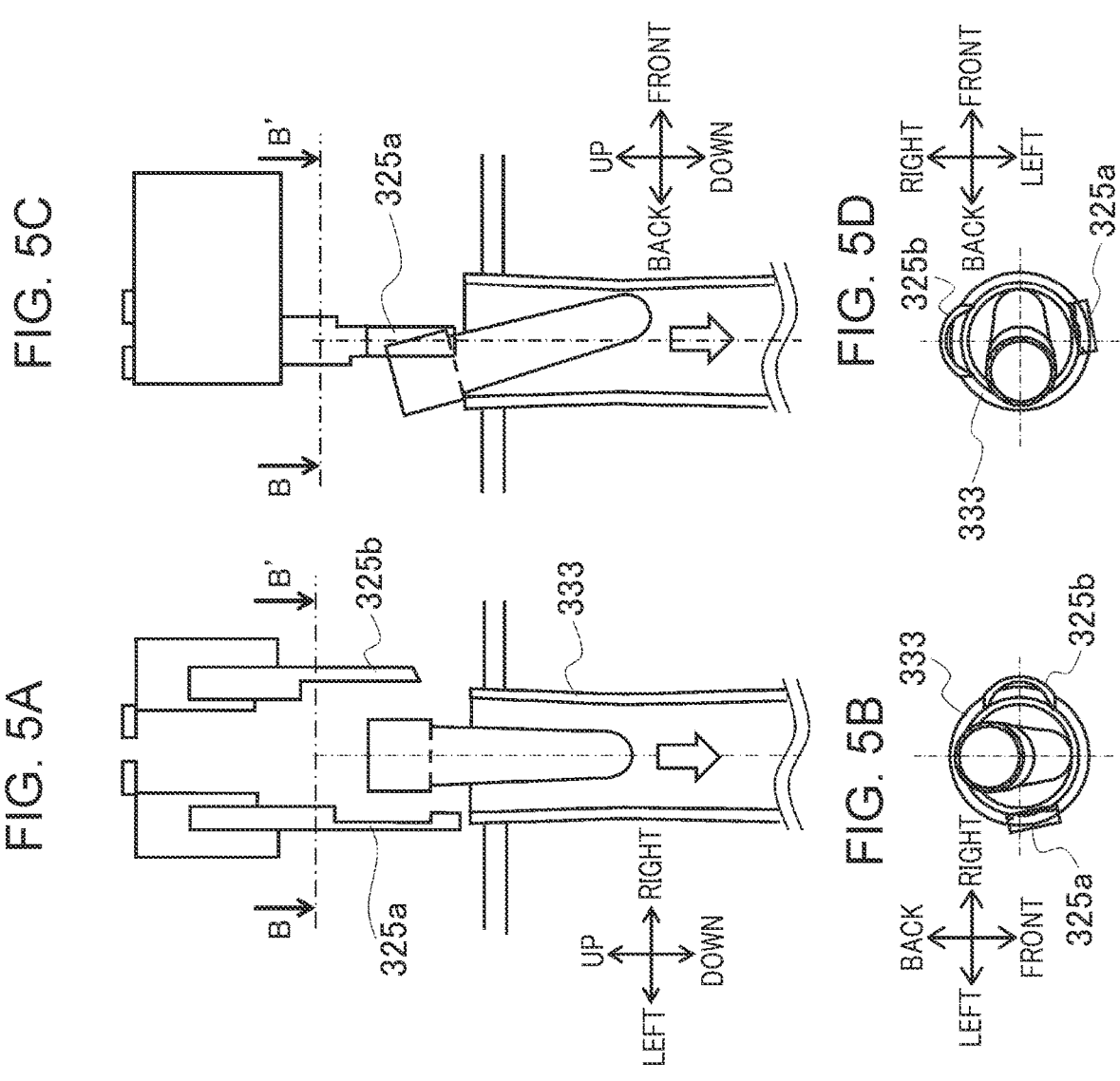

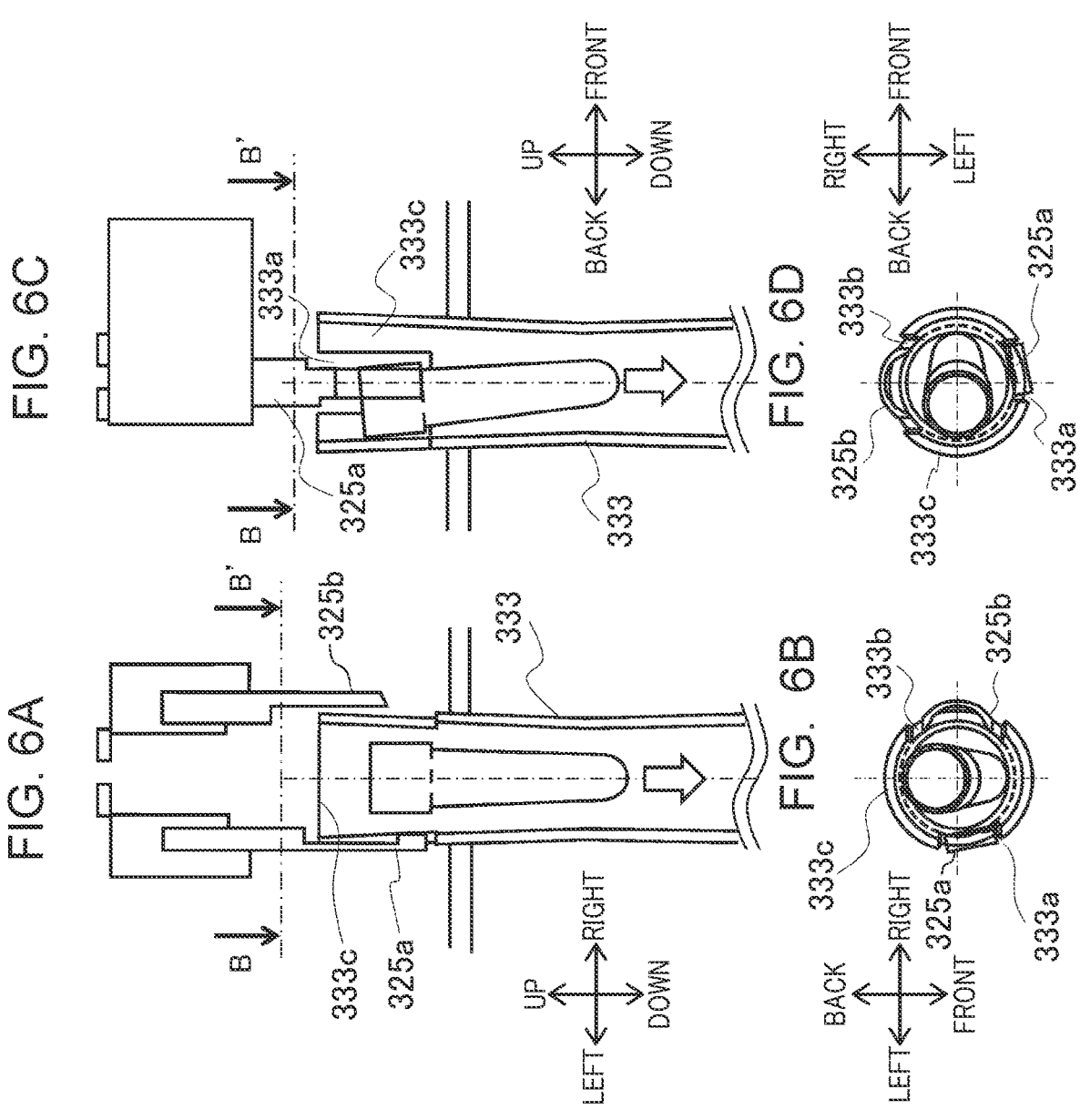

S101  REACTION CONTAINER TRANSPORT MECHANISM TRANSPORTS REACTION CONTAINER ONTO VERTICAL PROJECTION OF DISCARDING HOLE.

S102  VERTICAL MOVING MECHANISM MOVES DOWN CONTAINER GRIPPING MECHANISM GRIPPING REACTION CONTAINER.

S103  CONTAINER GRIPPING MECHANISM IS SEPARATED.

S104  VERTICAL MOVING MECHANISM MOVES UP CONTAINER GRIPPING MECHANISM.

FIG.8

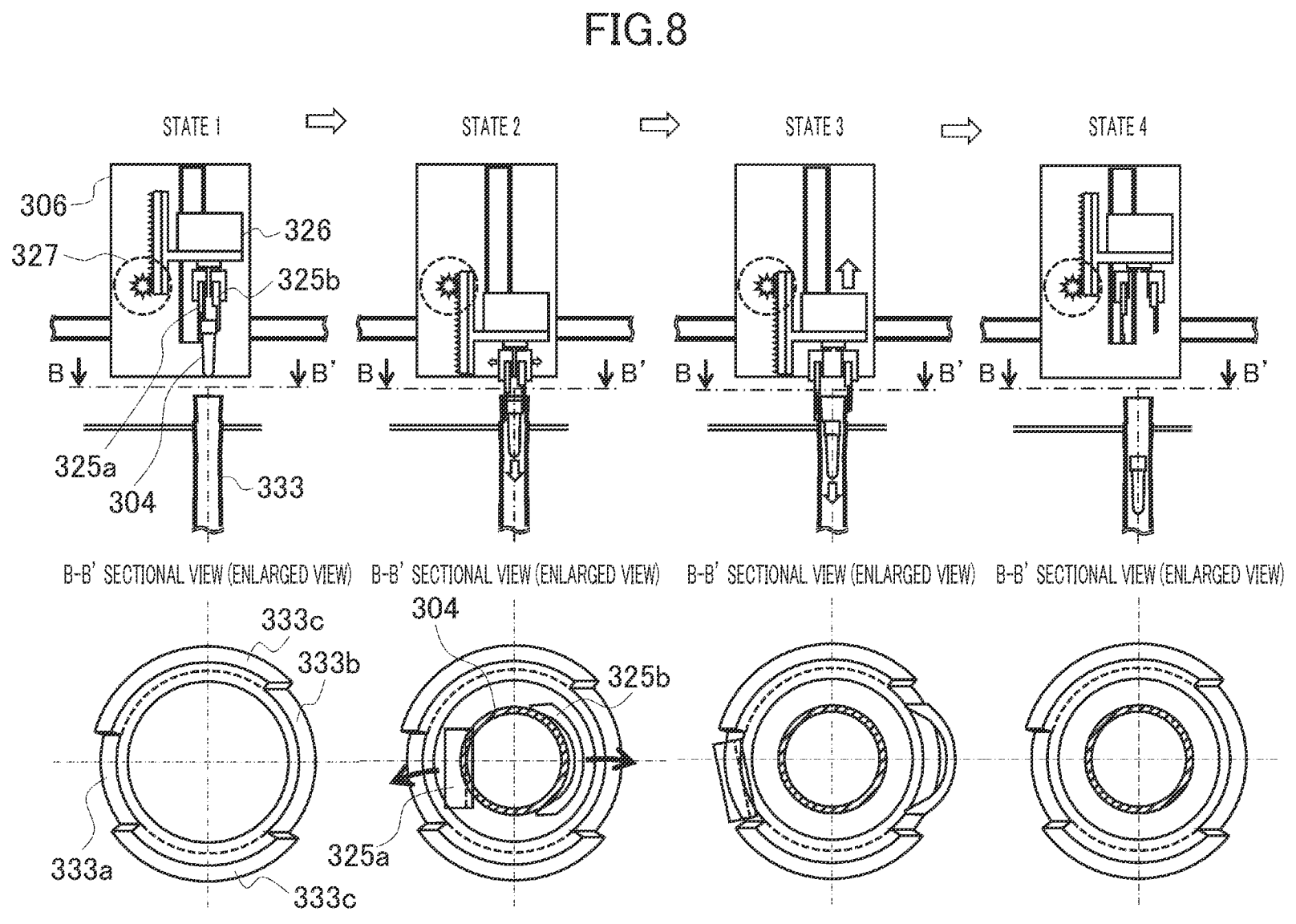

STATE 1    STATE 2    STATE 3    STATE 4

306
326
327
325b
325a
304
333

B-B' SECTIONAL VIEW (ENLARGED VIEW)    B-B' SECTIONAL VIEW (ENLARGED VIEW)    B-B' SECTIONAL VIEW (ENLARGED VIEW)    B-B' SECTIONAL VIEW (ENLARGED VIEW)

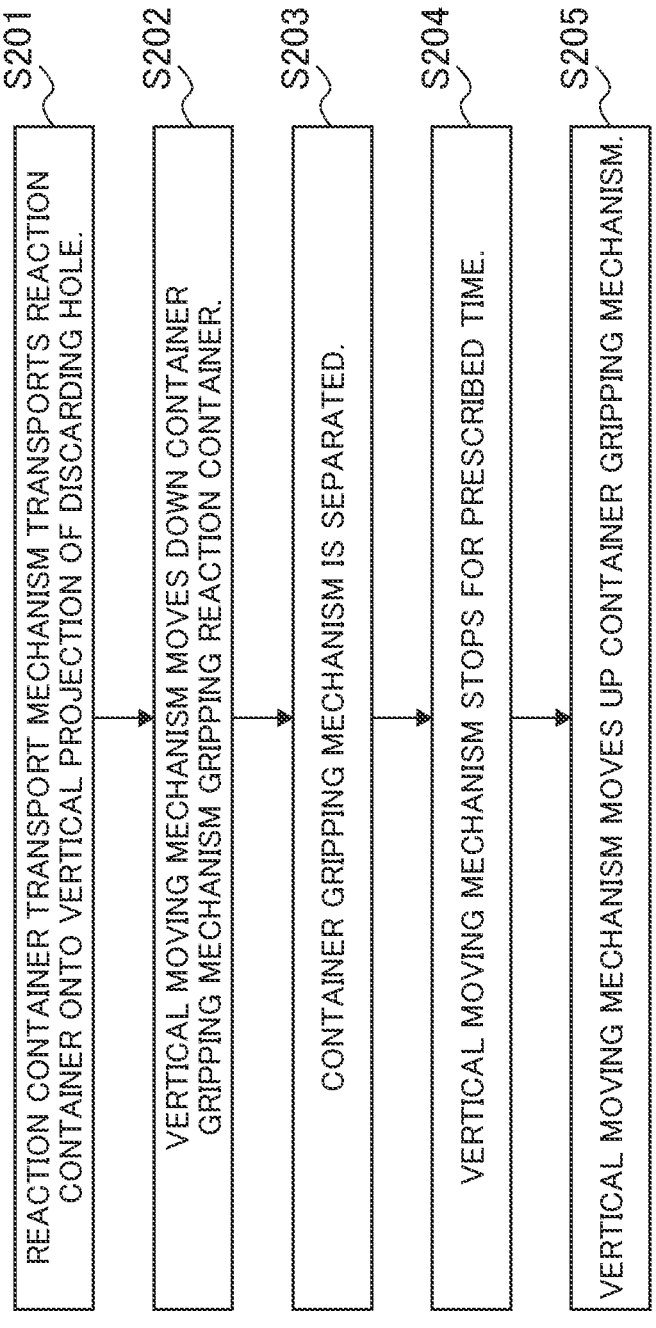

S201 — REACTION CONTAINER TRANSPORT MECHANISM TRANSPORTS REACTION CONTAINER ONTO VERTICAL PROJECTION OF DISCARDING HOLE.

S202 — VERTICAL MOVING MECHANISM MOVES DOWN CONTAINER GRIPPING MECHANISM GRIPPING REACTION CONTAINER.

S203 — CONTAINER GRIPPING MECHANISM IS SEPARATED.

S204 — VERTICAL MOVING MECHANISM STOPS FOR PRESCRIBED TIME.

S205 — VERTICAL MOVING MECHANISM MOVES UP CONTAINER GRIPPING MECHANISM.

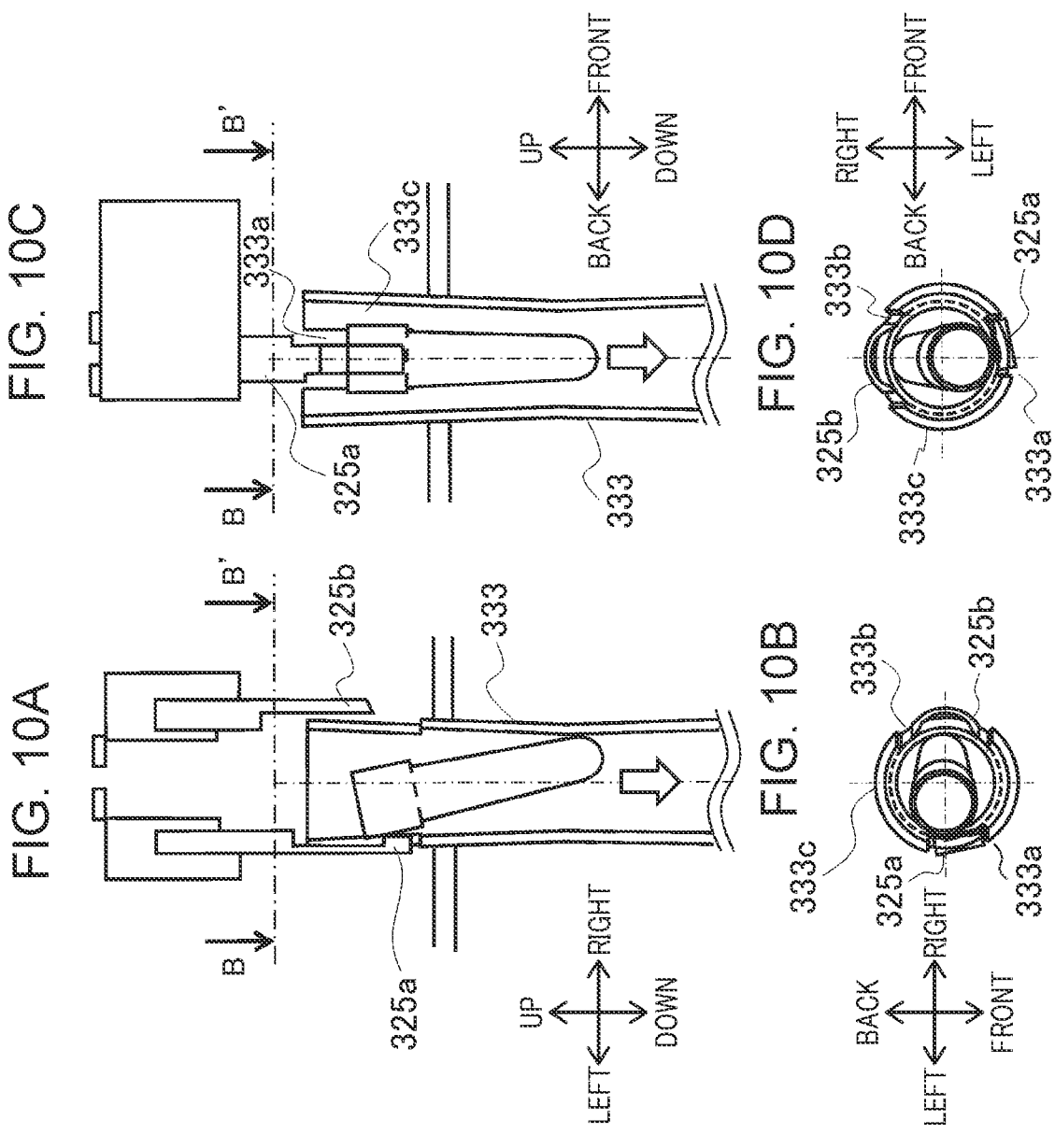

FIG. 11

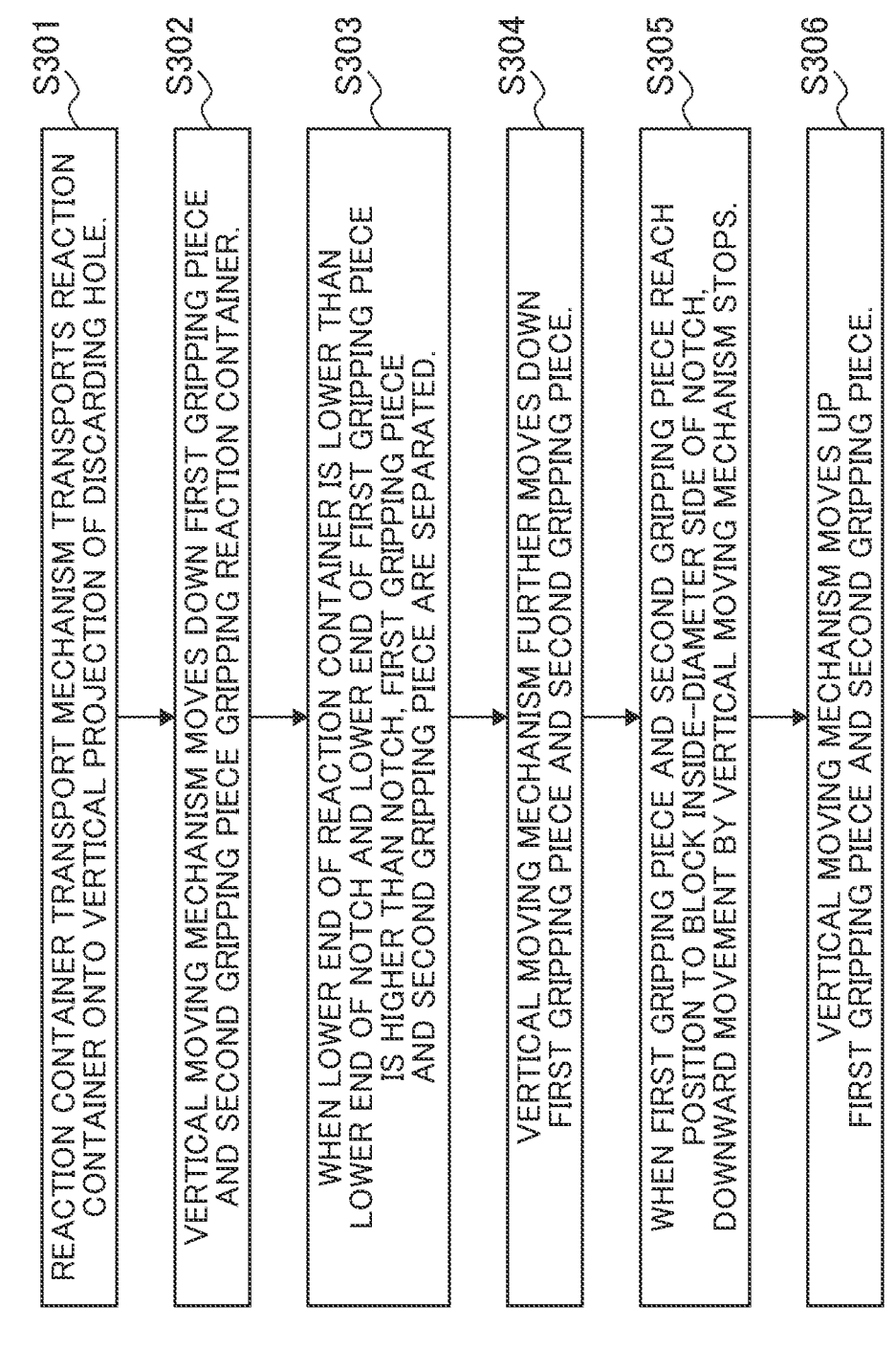

S301 — REACTION CONTAINER TRANSPORT MECHANISM TRANSPORTS REACTION CONTAINER ONTO VERTICAL PROJECTION OF DISCARDING HOLE.

S302 — VERTICAL MOVING MECHANISM MOVES DOWN FIRST GRIPPING PIECE AND SECOND GRIPPING PIECE GRIPPING REACTION CONTAINER.

S303 — WHEN LOWER END OF REACTION CONTAINER IS LOWER THAN LOWER END OF NOTCH AND LOWER END OF FIRST GRIPPING PIECE IS HIGHER THAN NOTCH, FIRST GRIPPING PIECE AND SECOND GRIPPING PIECE ARE SEPARATED.

S304 — VERTICAL MOVING MECHANISM FURTHER MOVES DOWN FIRST GRIPPING PIECE AND SECOND GRIPPING PIECE.

S305 — WHEN FIRST GRIPPING PIECE AND SECOND GRIPPING PIECE REACH POSITION TO BLOCK INSIDE-DIAMETER SIDE OF NOTCH, DOWNWARD MOVEMENT BY VERTICAL MOVING MECHANISM STOPS.

S306 — VERTICAL MOVING MECHANISM MOVES UP FIRST GRIPPING PIECE AND SECOND GRIPPING PIECE.

AUTOMATIC ANALYZER

TECHNICAL FIELD

The present invention relates to an automatic analyzer. ⁵

BACKGROUND ART

In recent years, an automatic analyzer for biochemically or immunologically analyzing a sample such as blood or urine has been known. Analysis is generally executed by performing a reaction between a sample and a reagent, and the reaction occurring between the reagent and the sample is optically and electrically detected.

Here, the reaction between the reagent and the sample is generally executed using a disposable reaction container in order to prevent contamination with other reagents and samples. Then, the used reaction container after the completion of the analysis is transported by a reaction container transport mechanism and discarded from a prescribed discarding hole. For example, PTL 1 discloses that a sample dispensing tip is discarded into a sample dispensing tip/reaction container discarding hole.

CITATION LIST

Patent Literature

PTL 1: JP2019-86418A

SUMMARY OF INVENTION

Technical Problem

After the completion of the analysis, as in PTL 1, a reaction container thrown into the reaction container discarding hole passes through a discarding cylinder and is accumulated in a housing portion such as a discarding box. However, when the reaction container is thrown into the discarding hole which is an open end in an upper end of the discarding cylinder, there is a possibility that the reaction container cannot be discarded normally when the reaction container is inclined, a bottom surface of the reaction container comes into contact with a side surface of the discarding cylinder, or a step portion (flange portion) of the reaction container comes into contact with the upper end of the discarding cylinder. If an inner diameter of the discarding cylinder is widened, the reaction container can be smoothly discarded, but a space in an automatic analyzer is restricted.

An object of the present invention is to provide an automatic analyzer which smoothly discards a used reaction container while preventing space restrictions.

Solution to Problem

In order to solve the above-described problem, an automatic analyzer of the present invention includes: a housing portion which houses a used container; a hollow discarding cylinder which guides the container to the housing portion in a vertical direction; a container gripping mechanism which grips the container by moving a plurality of gripping pieces close to each other in a horizontal direction and lets the container fall by separating the plural gripping pieces from each other in the horizontal direction; and a control section which controls the container gripping mechanism. A discarding hole in an upper end of the discarding cylinder is formed by a container guide portion for guiding the container and a gripping piece separating portion forming a space for the plural gripping pieces to be separated from each other.

Advantageous Effects of Invention

According to the present invention, it is possible to provide the automatic analyzer which smoothly discards a used reaction container while preventing space restrictions.

BRIEF DESCRIPTION OF DRAWINGS

FIGS. 4A and 4B are diagrams which show structures of a reaction container discarding hole, a first gripping piece and a second gripping piece according to the first embodiment.

FIGS. 5A to 5D are diagrams which show the movement of the reaction container as a comparative example in the case that the reaction container discarding hole has neither projection nor notch.

FIGS. 6A to 6D are diagrams which show the movement of the reaction container in the first embodiment.

FIG. 8 is a diagram which shows a change in a state of the reaction container transport mechanism and reaction container in the first embodiment.

FIG. 9 is a flowchart which shows a reaction container discarding operation in a second embodiment.

FIGS. 10A to 10D are diagrams which show the movement of the reaction container in the second embodiment.

FIG. 11 is a flowchart which shows a reaction container discarding operation in a third embodiment.

DESCRIPTION OF EMBODIMENTS

Embodiments of the present invention will be described in detail with reference to the drawings.

First Embodiment

Figure 1:
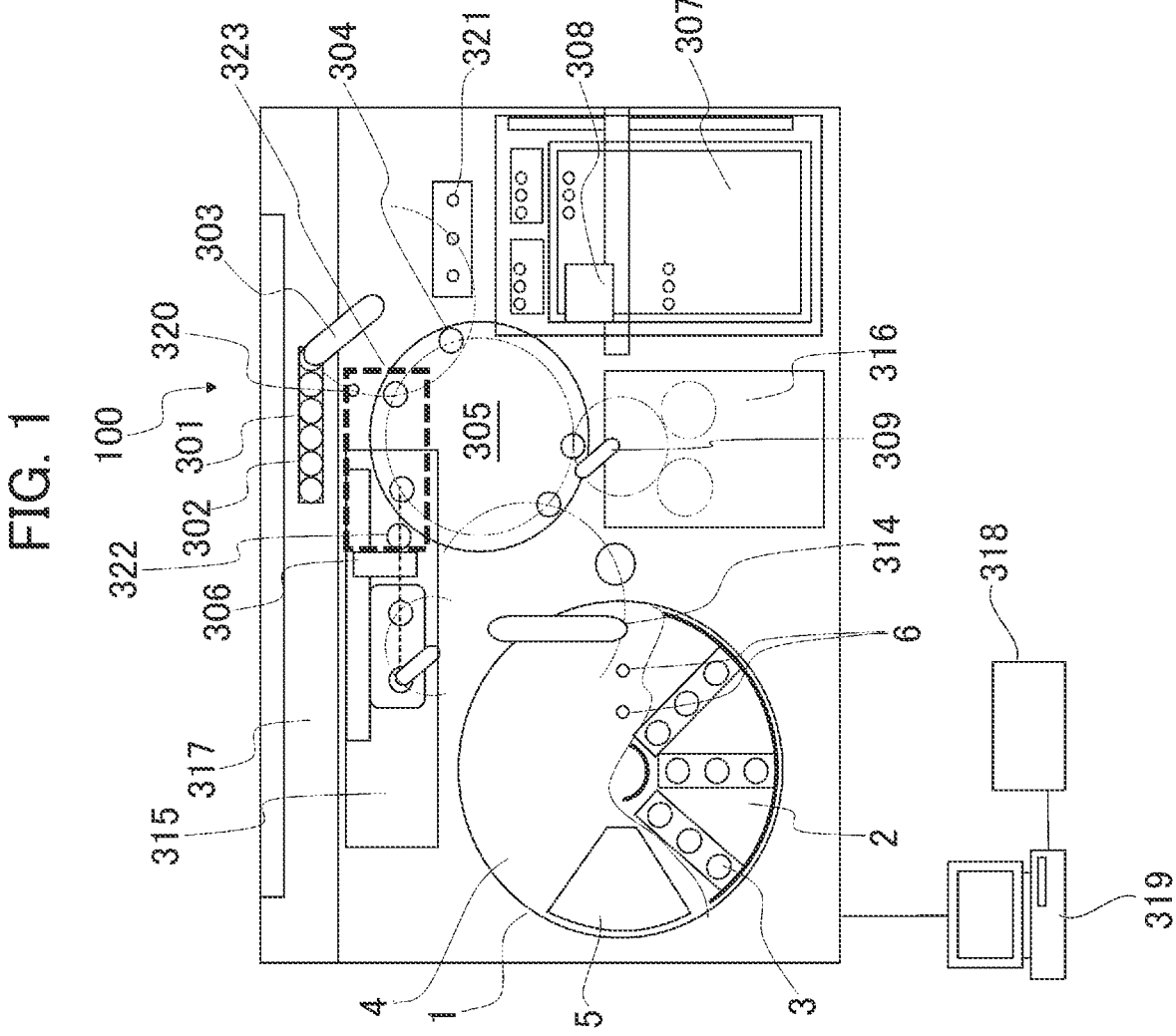
FIG. 1 is a plan view which shows a general structure of an automatic analyzer according to a first embodiment.

First, with reference to FIG. 1, an outline of a general structure of an automatic analyzer according to the present embodiment will be described. FIG. 1 is a plan view which shows the general structure of the automatic analyzer according to the present embodiment.

As shown in FIG. 1, an automatic analyzer 100 in the present embodiment is a device that causes a sample and a reagent to react with each other and measures reacted reaction liquid. The automatic analyzer 100 includes a reagent cooling box 1, a reagent container 3, a sample dispensing nozzle 303, a reaction table 305, a reaction container transport mechanism 306, a sample dispensing tip/reaction container holding member 307, a reagent disc 2, a reagent dispensing nozzle 314, a processing section 315, a detection section 316, a rack transport line 317, and a controller 319.

The rack transport line 317 is a line for transporting a rack 301, on which a plurality of sample containers 302 each housing the sample can be placed, to a sample dispensing position. The sample dispensing nozzle 303 is a nozzle for aspirating the sample housed in the sample container 302 and discharging the sample to a reaction container 304. The reaction table 305 is a disc for performing the reaction between the sample and the reagent at a constant temperature, and the reaction between the sample and the reagent is promoted by keeping the temperature at a prescribed temperature by a heater (not shown). The reaction containers 304 are held in plurality in the reaction table 305, and serve as a site in which the sample and the reagent are mixed and reacted. The reaction container transport mechanism 306 transports the reaction container 304. The sample dispensing tip/reaction container holding member 307 stores a disposable sample dispensing tip used for sample dispensing and the reaction container 304. The reagent disc 2 is a disc for storing the reagent containers 3, and is kept cool by the reagent cooling box 1 in order to stably store the reagent. The reagent container 3 can be accessed by a user or a reagent container transport mechanism (not shown) by opening an open/close cover 5 disposed on a lid 4. In addition, a part of the lid 4 is provided with a reagent aspiration hole 6 which is a through hole for reagent aspirating. The reagent dispensing nozzle 314 is a nozzle for aspirating the reagent stored in the reagent containers 3 in the reagent disc 2 through the reagent aspiration hole 6 and discharging the reagent to the reaction container 304. The reagent containers 3 in the reagent disc 2 house various assay reagents (first reagent) used for sample analysis. The processing section 315 performs processing before analysis of the sample by the detection section 316. The detection section 316 performs detection using a liquid in which the reaction is completed in the reaction container 304. The controller 319 controls various operations of each of the above-described members, and performs calculation processing for obtaining a concentration of a prescribed component in the sample based on a detection result obtained by the detection section 316. The controller 319 is provided with a control section 318 which controls the reaction container transport mechanism 306.

Next, an outline of an overall analysis flow in the automatic analyzer according to the present embodiment will be described. Prior to the analysis, the user puts consumables such as the reagent containers 3, the sample dispensing tip, and the reaction container 304 necessary for the analysis on the reagent disc 2 and the sample dispensing tip/reaction container holding member 307 in the analyzer, respectively.

First, the user throws the rack 301 into the automatic analyzer in a state in which the sample such as blood or urine to be analyzed is put into the sample container 302. Here, the unused reaction container 304 and sample dispensing tip are transported to the reaction table 305 and a sample dispensing tip mounting position 321 by a first transport mechanism 308 of the analyzer.

Thereafter, the reagent dispensing nozzle 314 is attached so as to be rotatable and vertically movable, moves down after rotationally moving above the reagent aspiration hole 6 provided in the lid 4 of the reagent cooling box 1, and passes through the reagent aspiration hole 6. Thereafter, a tip of the reagent dispensing nozzle 314 passing through the reagent aspiration hole 6 is inserted into the reagent in the prescribed reagent container 3 to aspirate a prescribed amount of reagent. Next, after the reagent dispensing nozzle 314 moves up, the reagent dispensing nozzle 314 rotationally moves above a prescribed position of the reaction table 305 to discharge the reagent into the reaction container 304 disposed on the reaction table 305.

Subsequently, when the rack 301 passes through the rack transport line 317 and reaches the sample dispensing position, the sample dispensing nozzle 303 is equipped with the sample dispensing tip, the sample is dispensed into the reaction container 304 from the sample container 302, and the reaction between the sample and the assay reagent is started. The reaction referred to herein means, for example, using a luminescence labeling antibody that reacts only with a specific antigen of the sample as the assay reagent, binding of the sample and a luminescence labeling substance by an antigen-antibody reaction. In this case, the sample and the assay reagent are stirred by aspirating and discharging the mixture of the sample and the assay reagent in the sample dispensing tip. After this operation is completed, the used sample dispensing tip is discarded to a sample dispensing tip discarding hole 320.

After the reaction between the sample and the assay reagent is started by stirring, another reagent may be further added at a specific timing to perform the reaction. For example, there is a process of further binding, to the above-described antigen, magnetic beads bound with an antibody to a surface thereof. For this purpose, the reaction container 304 placed on the reaction table 305 for a prescribed time is transported by the reaction container transport mechanism 306 to the processing section 315. In the processing section 315, magnetic separation and stirring of the sample are performed as pre-detection processing of the sample.

After the pre-processing process is completed, the reaction container 304 is transported to the reaction table 305 again by the reaction container transport mechanism 306.

Regardless of presence or absence of the magnetic separation, the reaction container 304 placed on the reaction table 305 for the prescribed time is guided to the detection section 316 by a second transport mechanism 309. The detection section 316 detects a signal from the reaction liquid, notifies the user of an analysis result, and records the analysis result in a memory device.

After a detection operation is completed, the reaction container 304 is transported to a reaction container discarding hole 322 by the second transport mechanism 309 and the reaction container transport mechanism 306, and is discarded. In a lower portion of the reaction container discarding hole 322 and the sample dispensing tip discarding hole 320, a housing portion 323 for accumulating the discarded reaction containers 304 and sample dispensing tip is provided.

Figure 3:
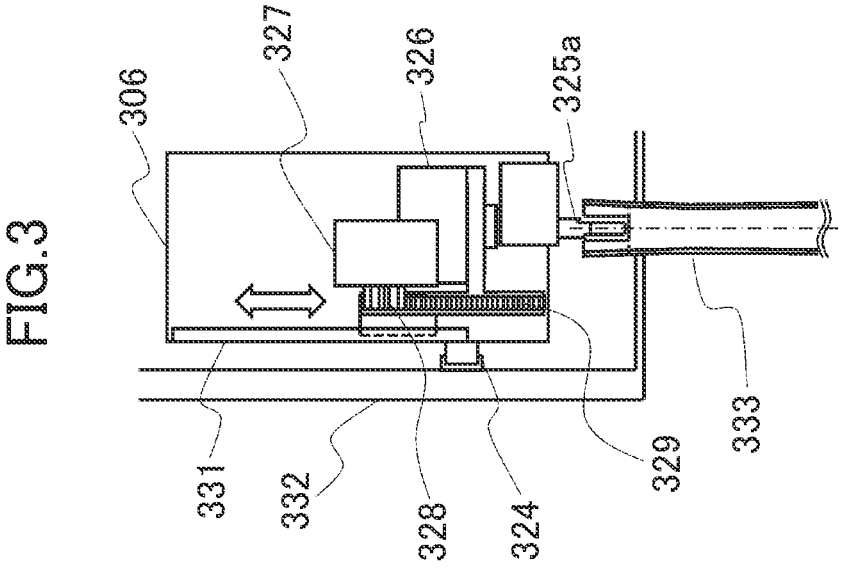
FIG. 3 is a view taken from an arrow A direction in FIG. 2.
Figure 2:
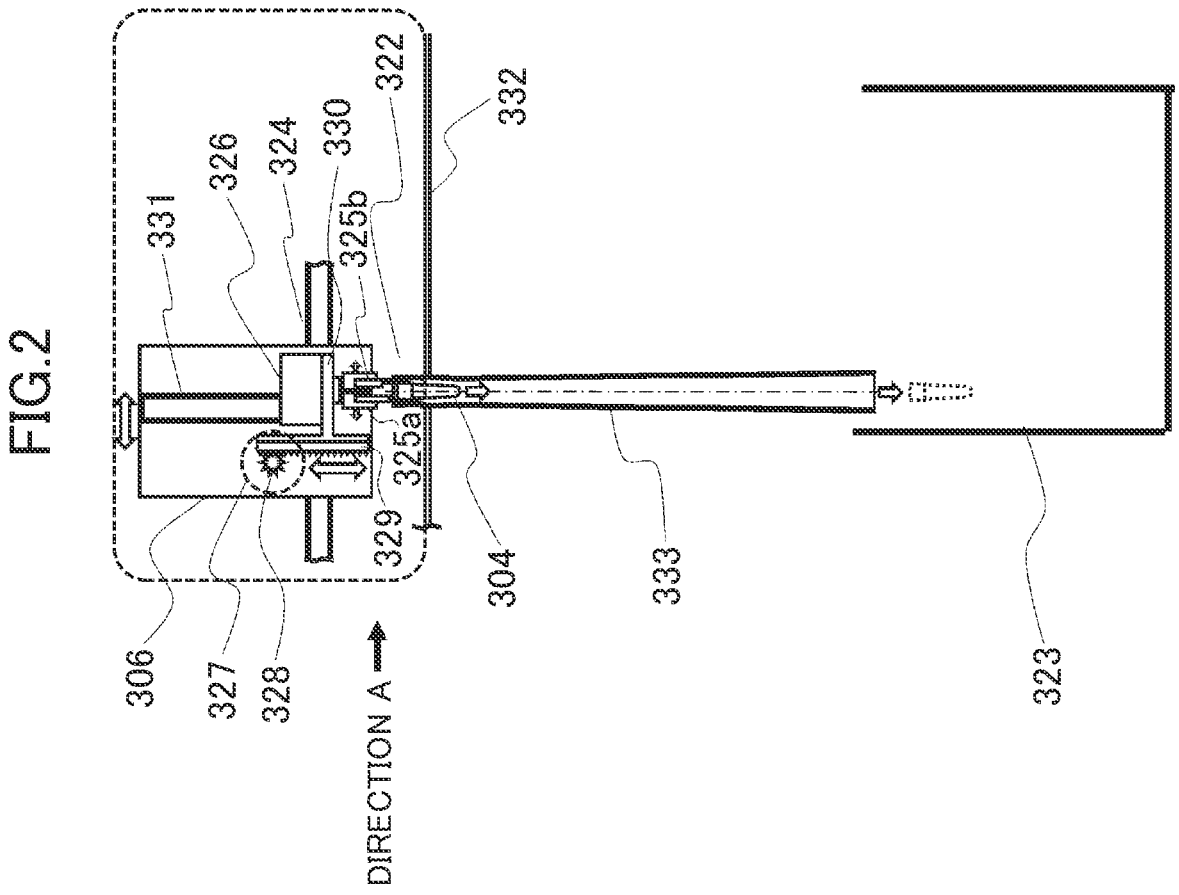
FIG. 2 is a front view of a main part of the automatic analyzer according to the first embodiment.

Next, a structure of the reaction container transport mechanism 306 will be described with reference to FIGS. 2 and 3. FIG. 2 is a front view of a main part of the automatic analyzer, and FIG. 3 is a view taken from an arrow A direction in FIG. 2. The reaction container transport mechanism 306 includes a container gripping mechanism which is disposed in a temperature control chamber 332 whose temperature is controlled by a temperature control device (not shown) using a Peltier element or the like and which grips the reaction container 304 and a vertical moving mechanism which moves the container gripping mechanism in a vertical direction. In addition, a main body case of the reaction container transport mechanism 306 is connected to a belt (not shown), and the belt is rotated by a motor (not shown), so that the reaction container transport mechanism 306 can move in a horizontal direction along a horizontal rail 324 fixed to a wall surface of the temperature control chamber 332.

Here, the container gripping mechanism includes a first gripping piece 325a and a second gripping piece 325b that abut against a side surface of the reaction container 304, and a solenoid 326 which moves the first gripping piece 325a and the second gripping piece 325b close to each other or separates the first gripping piece 325a and the second gripping piece 325b from each other. The container gripping mechanism grips the reaction container 304 by moving the first gripping piece 325a and the second gripping piece 325b close to each other in the horizontal direction and lets the reaction container 304 fall by separating the first gripping piece 325a and the second gripping piece 325b from each other in the horizontal direction. The container gripping mechanism may be activated by a motor or air cylinder instead of the solenoid 326.

The vertical moving mechanism includes a motor 327, a pinion gear 328 connected to a shaft of the motor 327, a rack portion 329 that converts rotary motion into linear motion by meshing with the pinion gear 328, a support portion 330 that is fixed to the rack portion 329 and supports the solenoid 326, and a vertical rail 331 that guides vertical movement of the support portion 330. In addition, the motor 327 and the vertical rail 331 are fixed to the main body case of the reaction container transport mechanism 306, and the rack portion 329 and the support portion 330 move vertically relative to the main body case. The vertical moving mechanism may be activated by a solenoid or air cylinder, instead of the motor 327.

By controlling rotation of the motor 327, the control section 318 moves up or down the first gripping piece 325a and the second gripping piece 325b together with the container gripping mechanism. In addition, the control section 318 opens the first gripping piece 325a and the second gripping piece 325b by energizing the solenoid 326, and closes the first gripping piece 325a and the second gripping piece 325b through a spring force by turning off the energization of the solenoid 326.

As shown in FIG. 2, a hollow discarding cylinder 333 which extends in the vertical direction and guides the reaction container 304 to the housing portion 323 is connected to a bottom surface of the temperature control chamber 332. Therefore, the reaction container 304 thrown from an open end (reaction container discarding hole 322) in an upper end of the discarding cylinder 333 falls by gravity while being guided by an inner surface of the discarding cylinder 333, and is housed in the housing portion 323 as the used reaction container 304.

Next, a structure of the reaction container discarding hole 322 will be described with reference to FIG. 4. FIG. 4 is a diagram which shows structures of the reaction container discarding hole 322, the first gripping piece 325a, and the second gripping piece 325b, in which (a) is a front view, and (b) is a plan view of B-B' of (a) as seen from above. As shown in (a) of FIG. 4, the upper open end of the discarding cylinder 333 protrudes upward from the bottom surface of the temperature control chamber 332 and has a plurality of projections 333c. In addition, as shown in (b) of FIG. 4, notches 333a and 333b are formed at respective positions corresponding to trajectories (see an arrow in (b) of FIG. 4) along which the first gripping piece 325a and the second gripping piece 325b are separated from each other in the upper open end of the discarding cylinder 333. That is, since the notches 333a and 333b are formed at the upper end of the discarding cylinder 333, the plural projections 333c in the present embodiment are inevitably formed as remaining parts, and can be integrally formed with a main body of the discarding cylinder 333 extending downward, and there is an advantage that it is easy to manufacture. This does not prevent the projections 333c from being formed separately from the main body of the discarding cylinder 333.

As shown in FIG. 4A, the reaction container 304 is formed with, at an upper side, a flange portion having an outer diameter larger than that of a lower side of the reaction container 304, and thus a step is present at a lower end of the flange portion. Therefore, a claw is provided at a lower end of the first gripping piece 325a, so that the claw can engage the flange portion of the reaction container 304. The second gripping piece 325b is not provided with a claw, but has a curved abutment surface, and grips the reaction container 304 in conjunction with the first gripping piece 325a by pressing the abutment surface against a side surface of the flange portion of the reaction container 304. Thus, by providing the claw only on the first gripping piece 325a, the reaction container 304 is likely to fall when the first gripping piece 325a and the second gripping piece 325b are separated from each other. Here, since a power from the solenoid 326 is transmitted to the first gripping piece 325a and the second gripping piece 325b via a link mechanism (not shown), the separation trajectories are an arc shape as shown in FIG. 4B.

FIGS. 5A to 5D are diagrams which show the movement of the reaction container 304 as a comparative example in the case that the reaction container discarding hole 322 has neither projection nor notch, in which FIG. 5A is a front view, FIG. 5B is a plan view of B-B' in FIG. 5A as seen from above, FIG. 5C is a left side view, and FIG. 5D is a plan view of B-B' in FIG. 5C as seen from above. As shown in FIG. 5A, when the first gripping piece 325a and the second gripping piece 325b are separated from each other, the lower end of the first gripping piece 325a is in a higher position than the upper end of the discarding cylinder 333, and thus the flange portion of the reaction container 304 is also in a higher position than the upper end of the discarding cylinder 333. Therefore, when balance of the reaction container 304 is lost at the time of separating the container gripping mechanism, and for example, the reaction container 304 is inclined in a backward tilted state as shown in (e) of FIG. 5C, the side surface of the flange portion of the reaction container 304 may abut against the upper end of the discarding cylinder 333, and a bottom surface of the reaction container 304 may abut against a side surface of the discarding cylinder 333. In such a case, when the reaction container 304 does not smoothly fall to the housing portion 323, a work made by an operator may be required.

FIGS. 6A to 6D are diagrams which show the movement of the reaction container 304 in the present embodiment, in which FIG. 6A is a front view, FIG. 6B is a plan view of B-B' in FIG. 6A as seen from above, FIG. 6A is a left side view, and FIG. 6D is a plan view of B-B' in FIG. 6C as seen from above. In the present embodiment, as described above, the notches 333a and 333b are formed on the separation trajectories of the first gripping piece 325a and the second gripping piece 325b, respectively. Therefore, as shown in FIG. 6A, the control section 318 can move down lower ends of the first gripping piece 325a and the second gripping piece 325b to a lower position than the upper end of the projections 333c and then separate the container gripping mechanism. Therefore, when the balance of the reaction container 304 is lost at the time of separating the container gripping mechanism, and for example, the reaction container 304 is inclined in a backward tilted state as shown in FIG. 6C, the flange portion of the reaction container 304 does not abut against the upper end of the projections 333c. Further, if the control section 318 separates the container gripping mechanism at a position at which an upper end of the reaction container 304 is lower than the upper end of the projections 333c, even when the reaction container 304 is inclined, the reaction container 304 falls more smoothly by merely bringing an upper side surface of the reaction container 304 into contact with side surfaces of the projections 333c.

Thus, the projections 333c of the present embodiment function as a container guide portion that comes into contact with the side surface of the reaction container 304 and guides the reaction container 304 downward while regulating the movement of the reaction container 304. Here, when the projections 333c are inclined such that an inner diameter thereof increases upward, there is an advantage that the reaction container 304 is likely to be thrown. However, when the upper end of the projections 333c is widened too much, the reaction container 304 may be caught in an inclined manner, or the air in the temperature control chamber 332 may leak out, which reduces a temperature control effect. Therefore, it is desirable that the inner diameter in the upper end of the projections 333c is 100 to 110% of the inner diameter in a lower end of the projections 333c.

Meanwhile, the notches 333a and 333b function as a gripping piece separating portion that forms a space for the first gripping piece 325a and the second gripping piece 325b to be separated from each other in order to let the reaction container 304 fall. Here, when the notches 333a and 333b are too long in a circumferential direction and the projections 333c are too short in the circumferential direction, the reaction container 304 may be fitted into the notches 333a and 333b and may be greatly inclined, and thus the reaction container 304 may not smoothly fall. Therefore, it is desirable that a gap between the separation trajectories of the first gripping piece 325a and the second gripping piece 325b and a circumferential end of the projections 333c is smaller than an outer diameter of the reaction container 304.

Figure 7:
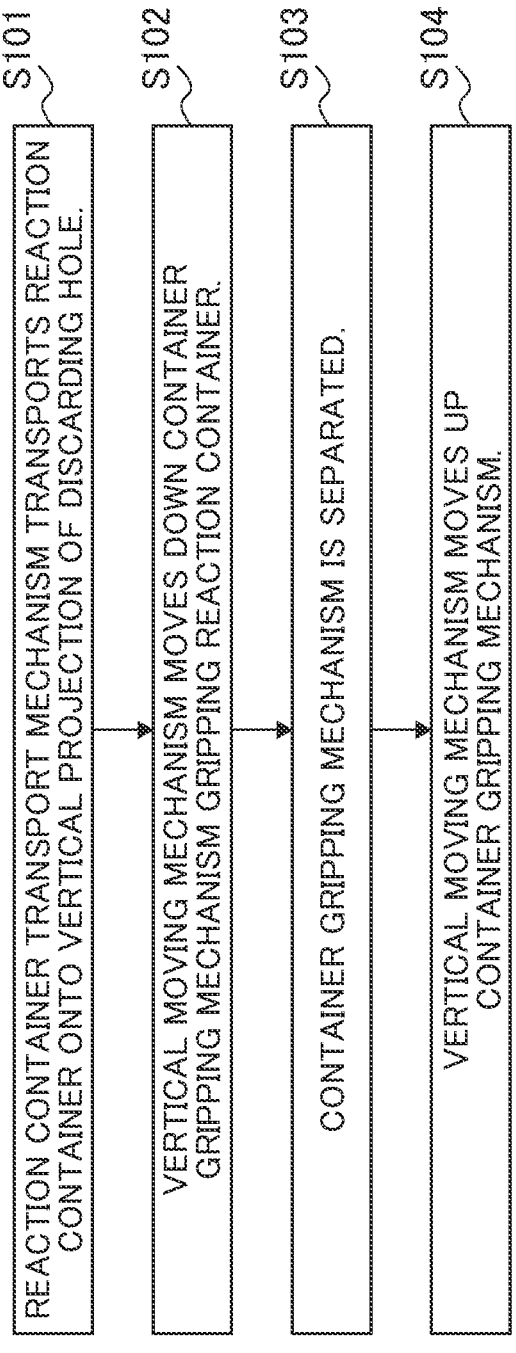
FIG. 7 is a flowchart which shows a reaction container discarding operation in the first embodiment.

A flow of a discarding operation of the reaction container 304 by the reaction container transport mechanism 306 in the present embodiment will be described below. FIG. 7 is a flowchart which shows the discarding operation of the reaction container 304 in the present embodiment, and FIG. 8 is a diagram which shows a change in a state of the reaction container transport mechanism 306 and the reaction container 304. First, the control section 318 controls the rotation of the motor (not shown) to horizontally move the reaction container transport mechanism 306, thereby transporting the reaction container 304 onto a vertical projection of the reaction container discarding hole 322 (step S101), resulting in State 1 in FIG. 8. Next, the control section 318 controls the rotation of the motor 327 that constitutes the vertical moving mechanism to move down the container gripping mechanism (step S102), and shifts to State 2 in FIG. 8. At this time, as described above, it is desirable that the control section 318 moves down the first gripping piece 325a and the second gripping piece 325b until the upper end of the reaction container 304 is in a lower position than the upper end of the projections 333c.

Thereafter, the control section 318 energizes the solenoid 326 of the container gripping mechanism to separate the first gripping piece 325a and the second gripping piece 325b from each other (step S103), and the reaction container 304 falls as in State 3 in FIG. 8. Simultaneously with the separation of the container gripping mechanism, the control section 318 controls the rotation of the motor 327 to move up the container gripping mechanism (step S104), and shifts to State 4 in FIG. 8 to prepare for the transport of the next reaction container 304.

As described above, in the present embodiment, the discarding hole in the upper end of the discarding cylinder 333 is formed by the container guide portion and the gripping piece separating portion, and only the upper side surface or the bottom surface of the reaction container 304 comes into contact with the side surface of the discarding cylinder 333 even when the reaction container 304 is most inclined. Therefore, when the used reaction container 304 is thrown into the discarding hole, the used reaction container 304 smoothly falls in the discarding cylinder 333. In addition, in the present embodiment, although a part (projections 333c) of the discarding cylinder 333 protrudes upward from the bottom surface of the temperature control chamber 332, there are less space restrictions in the automatic analyzer as compared with a case in which an inner diameter of the discarding cylinder 333 is uniformly increased, and an amount of heat entering the temperature control chamber 332 through the discarding cylinder 333 is also prevented.

Second Embodiment

The second embodiment differs from the first embodiment in an operation of the reaction container transport mechanism 306 when the reaction container 304 is discarded. FIG. 9 is a flowchart which shows a discarding operation of the reaction container 304 in the present embodiment.

As shown in FIG. 9, in the present embodiment, as in the first embodiment, the control section 318 first controls the rotation of the motor (not shown) to horizontally move the reaction container transport mechanism 306, thereby transporting the reaction container 304 onto the vertical projection of the reaction container discarding hole 322 (step S201). Next, the control section 318 controls the rotation of the motor 327 that constitutes the vertical moving mechanism to move down the container gripping mechanism (step S202).

Thereafter, the control section 318 energizes the solenoid 326 of the container gripping mechanism to separate the first gripping piece 325a and the second gripping piece 325b from each other (step S203). At this time, in the present embodiment, the separated first gripping piece 325a and the second gripping piece 325b block an inside-diameter side of a gripping piece separating portion (notches 333a and 333b). Specifically, an inside-diameter side end of the first gripping piece 325a and the second gripping piece 325b when separated from each other is nearer to an inside-diameter side than the container guide portion (projections 333c). Thus, even when the reaction container 304 is inclined to the left or the right where no projection 333c is present, the first gripping piece 325a and the second gripping piece 325b may guide the reaction container 304 and let the reaction container 304 smoothly fall.

In addition, in the first embodiment, the container gripping mechanism is moved up at the same time as the container gripping mechanism is separated, whereas in the present embodiment, after the container gripping mechanism is separated, the container gripping mechanism is moved up after a prescribed time elapses. That is, after separating the first gripping piece 325a and the second gripping piece 325b from each other, the control section 318 stops the vertical moving mechanism for a prescribed time and then activates the vertical moving mechanism to move up the first gripping piece 325a and the second gripping piece 325b (step S204).

Here, the prescribed time is calculated in advance as a time until the upper end of the reaction container 304 becomes lower than the lower end of the first gripping piece 325a after the reaction container 304 falls by separating the container gripping mechanism. As a timing when the control section 318 moves up the container gripping mechanism, a trigger is performed when a separately provided sensor detects that the reaction container 304 passes a prescribed height, instead of setting the lapse of the prescribed time to a trigger.

FIGS. 10A to 10D are diagrams which show the movement of the reaction container 304 in the present embodiment, in which FIG. 6A is a front view, FIG. 6B is a plan view of B-B' in FIG. 6A as seen from above, FIG. 6C is a left side view, and FIG. 6D is a plan view of B-B' in FIG. 6C as seen from above. In the present embodiment, the first gripping piece 325a guides the falling of the reaction container 304 for a while even after the container gripping mechanism is separated. Therefore, as shown in FIG. 6A, even when the reaction container 304 is temporarily inclined to the left, the reaction container 304 may smoothly fall.

Third Embodiment

The third embodiment differs from the first embodiment and the second embodiment in an operation of the reaction container transport mechanism 306 when the reaction container 304 is discarded. FIG. 11 is a flowchart which shows a discarding operation of the reaction container 304 in the present embodiment, and FIG. 12 is a diagram which shows a change in a state of the reaction container transport mechanism 306 and the reaction container 304.

Figure 12:
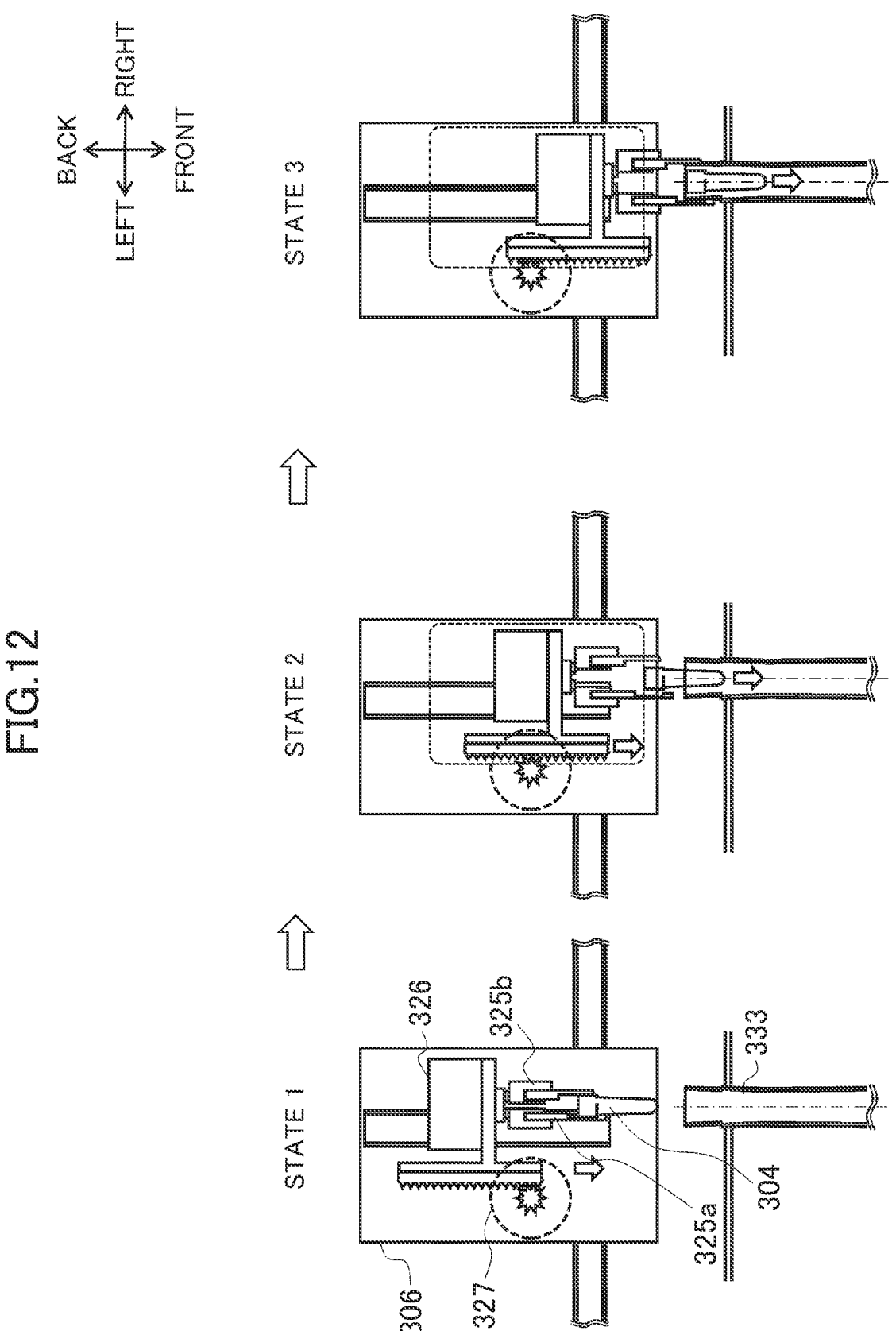
FIG. 12 is a diagram which shows a change in a state of the reaction container transport mechanism and reaction container in the third embodiment.

As shown in FIG. 11, in the present embodiment, as in the first embodiment and the second embodiment, the control section 318 first horizontally moves the reaction container transport mechanism 306, thereby transporting the reaction container 304 onto the vertical projection of the reaction container discarding hole 322 (step S301), resulting in State 1 in FIG. 12. Next, the control section 318 controls the motor 327 that constitutes the vertical moving mechanism to move down the container gripping mechanism (step S302).

Then, in the present embodiment, as shown in State 2 in FIG. 12, when the lower end of the reaction container 304 is lower than the lower end of the gripping piece separating portion (notches 333a and 333b), and the lower end of the first gripping piece 325a is in a higher position than the upper end of the gripping piece separating portion, the first gripping piece 325a and the second gripping piece 325b are separated from each other (step S303). Even after the reaction container 304 starts to fall by separating the first gripping piece 325a and the second gripping piece 325b from each other, the control section 318 further continues to move down the container gripping mechanism (step S304). Then, when the first gripping piece 325a and the second gripping piece 325b reach a position to block the inside-diameter side of the gripping piece separating portion as in State 3 in FIG. 12, the control section 318 stops the rotation of the motor 327 to stop the downward movement of the container gripping mechanism (step S305). Subsequently, immediately after the container gripping mechanism is stopped, the control section 318 switches the container gripping mechanism to the upward movement to prepare for the transport of the next reaction container 304 (step S306).

In the present embodiment, since the reaction container 304 starts to fall while the container gripping mechanism is moving down, a time required until the reaction container 304 is discarded can be shortened as compared with the first embodiment and the second embodiment. In addition, the first gripping piece 325a and the second gripping piece 325b separated from each other during the downward movement move down in parallel with the falling of the reaction container 304, and thus, even when the reaction container 304 is inclined to the left or the right, the first gripping piece 325a or the second gripping piece 325b prevents the reaction container 304 from being further inclined. It is desirable that a downward movement speed of the container gripping mechanism is equal to or higher than a falling speed of the reaction container 304.

The present invention is not limited to the above-described embodiments, and includes various modifications. For example, although the notches 333a and 333b are formed as the gripping piece separating portions in the above-described embodiments, these portions may be enlarged in a radial direction to have a dimension equal to or larger than the separation trajectories of the gripping pieces. In addition, in the above-described embodiments, although the first gripping piece 325a and the second gripping piece 325b have a non-symmetrical shape, the second gripping piece 325b may also be provided with a claw and may have a shape symmetrical with the first gripping piece 325a. Further, the number of gripping pieces may be three or more instead of two. Alternatively, a buffer material may be attached to an inner circumferential surface of the discarding cylinder 333 to reduce an impact force when the reaction container 304 is thrown into the reaction container discarding hole 322, thereby preventing the inclination of the reaction container 304 due to rebound and letting the reaction container 304 smoothly fall. The buffer material may protrude upward from the temperature control chamber 332 instead of the projections 333c of the above-described embodiments.

Further, a part of a configuration of one embodiment may be replaced with a configuration of another embodiment, and the configuration of the other embodiment may be added to the configuration of the one embodiment. In addition, a part of the configurations of the embodiments may be added to, deleted from, or replaced with another configuration.

REFERENCE SIGNS LIST

1: member
1: reagent cooling box
2: reagent disc
3: reagent container
4: lid
5: open/close cover
6: reagent aspiration hole
100: automatic analyzer
301: rack
302: sample container
303: sample dispensing nozzle
304: reaction container
305: reaction table
306: reaction container transport mechanism
307: sample dispensing tip/reaction container holding member
308: first transport mechanism
309: second transport mechanism
314: reagent dispensing nozzle
315: processing section
316: detection section
317: rack transport line
318: control section
319: controller
320: sample dispensing tip discarding hole
321: sample dispensing tip mounting position
322: reaction container discarding hole 323: housing portion
324: horizontal rail
325*a*: first gripping piece
325*b*: second gripping piece
326: solenoid
327: motor
328: pinion gear
329: rack portion
330: support portion
331: vertical rail
332: temperature control chamber
333: discarding cylinder
333*a*: notch
333*b*: notch
333*c*: projection

The invention claimed is:

1. An apparatus configured to discard a used container in an automatic analyzer, the apparatus comprising:
a housing portion which houses the used container;
a hollow discarding cylinder which guides the container to the housing portion in a vertical direction;
a container gripping mechanism which grips the container by moving a plurality of gripping pieces close to each other in a horizontal direction and lets the container fall by separating the plural gripping pieces from each other in the horizontal direction; and
a control section which controls the container gripping mechanism, wherein
a discarding hole in an upper end of the discarding cylinder is formed by a container guide portion for guiding the container and a gripping piece separating portion forming a space for the plural gripping pieces to be separated from each other, and
the gripping piece separating portion is a notch made in the upper end of the discarding cylinder,
wherein the plurality of gripping pieces includes a first gripping piece that has a claw, which is arranged at a bottom end of the first gripping piece and is configured to engage a flange of the container, and a second gripping piece that does not have a claw and has a curved abutment surface that abuts against a curved outer surface of the container above the flange.

2. The apparatus according to claim 1, further comprising:
a vertical moving mechanism which moves the plural gripping pieces in the vertical direction;

wherein, when the plural gripping pieces are falling through the vertical moving mechanism, a lower end of the container is lower than a lower end of the gripping piece separating portion and a lowermost end of the plural gripping pieces is in a higher position than an upper end of the gripping piece separating portion, the control section separates the plural gripping pieces from each other to let the container fall, and then further moves down the plural gripping pieces through the vertical moving mechanism and blocks an inside-diameter side of the gripping piece separating portion.

3. The apparatus according to claim 1,
wherein, when an upper end of the container is in a lower position than the discarding hole, the control section separates the plural gripping pieces from each other and lets the container fall.

4. The apparatus according to claim 1,
wherein, when the container falls, the plural gripping pieces block an inside-diameter side of the gripping piece separating portion and the plural gripping pieces guide the container.

5. The apparatus according to claim 4, wherein
when the container falls, an inside-diameter side end of the plural gripping pieces is nearer to an inside-diameter side than the container guide portion.

6. The apparatus according to claim 2, comprising:
the vertical moving mechanism which moves the plural gripping pieces in the vertical direction, wherein
after separating the plural gripping pieces from each other, the control section activates the vertical moving mechanism to move up the plural gripping pieces when the upper end of the container is lower than the lowermost end of the plural gripping pieces.

7. The apparatus according to claim 2, comprising:
the vertical moving mechanism which moves the plural gripping pieces in the vertical direction, wherein
after separating the plural gripping pieces from each other, the control section stops the vertical moving mechanism for a prescribed time and then activates the vertical moving mechanism to move up the plural gripping pieces.

8. The apparatus according to claim 1, wherein the first gripping piece and the second gripping piece are disposed on opposites sides of the container.

* * * * *